United States Patent Office 3,585,727
Patented June 22, 1971

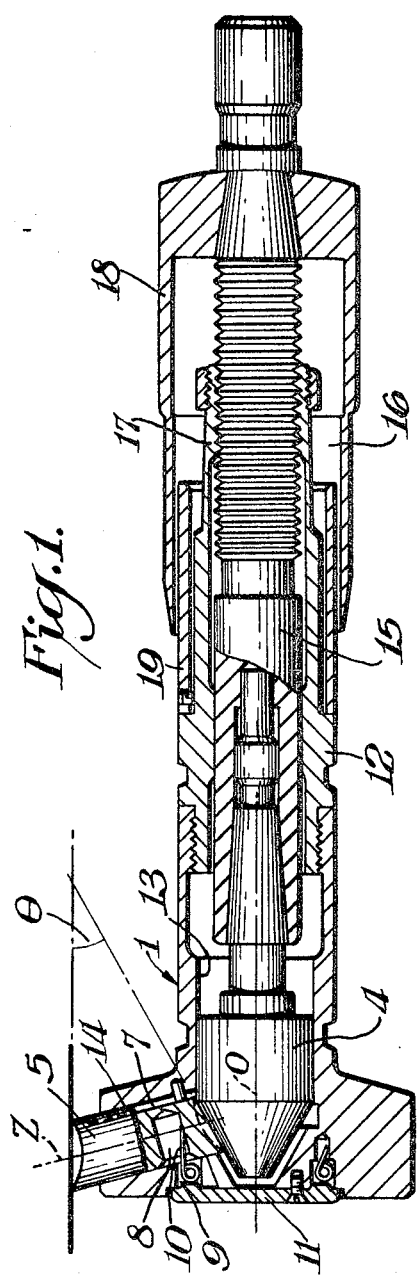
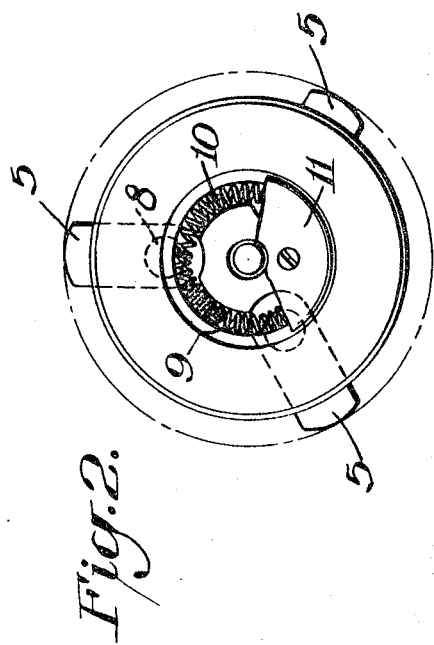

3,585,727
MEASURING INSTRUMENTS
Toji Hirose, Yokohama, Japan, assignor to
Yehan Numata, Yokohama, Japan
Filed Sept. 15, 1969, Ser. No. 857,672
Claims priority, application Japan, Sept. 19, 1968,
43/67,470
Int. Cl. G01b 5/12
U.S. Cl. 33—178
2 Claims

ABSTRACT OF THE DISCLOSURE

An instrument for measuring inside dimensions comprising a cone-shaped motivating head freely movable in a longitudinal direction parallel to the inside surface of an object being measured when the head is positioned inside the object. One end of each of the several bar-shaped feeler members engages an inclined face of the cone-shaped motivating head for movement toward and away from the axis of the motivating head as the head moves in a longitudinal direction relative to the feeler members. Each bar-shaped feeler member has a longitudinal axis perpendicular to the line that bisects the angle formed by the inclined face of the cone-shaped motivating head and the axis of the head.

BACKGROUND OF THE INVENTION

The present invention relates to a measuring instrument, and more particularly to an instrument for measuring inside dimensions in a highly accurate and dependable manner.

Prior to the present invention numerous devices have been proposed for measuring the inside dimensions of tubular items. For the most part, these devices include feeler elements that move outwardly to engage the interior surface of the item being measured. Such movement of the feelers causes them to rock and become inclined which adversely affects the accuracy of the measuring device.

Accordingly, it is an object of the present invention to provide a measuring instrument which avoids the above disadvantages and which functions in an extremely accurate and highly reliable manner.

SUMMARY OF THE INVENTION

In accordance with the present invention an instrument is provided for measuring inside dimensions, such as the interior diameter of tubular stock. The instrument comprises a cone-shaped motivating head freely movable in a longitudinal direction parallel to the inside surface of the object being measured. One end of each of several bar-shaped feeler members engages the inclined face of the cone-shaped motivating head for movement toward and away from the motivating head as the head moves in the longitudinal direction. Each bar-shaped feeler member has a longitudinal axis perpendicular to a line that bisects an angle formed by the inclined face of the cone-shaped motivating head and the axis of the cone-shaped head. One end of each bar-shaped feeler member squarely engages the inclined face of the cone-shaped motivating head and the other end of each feeler member squarely engages the inside surface of the object being measured.

Additionally, the ends of each bar-shaped feeler member may be outwardly curved. The curved end portions of each feeler member are equal to eliminate error that might otherwise be caused by slight rotation of the feeler members.

BRIEF DESCRIPTION OF THE DRAWING

Novel features and advantages of the present invention in addition to those mentioned above will become apparent to one skilled in the art from a reading of the following detailed description in conjunction with the accompanying drawing wherein:

FIG. 1 is a sectional view of a measuring instrument according to the present invention;

FIG. 2 is a front elevational view of the instrument shown in FIG. 1 with portions broken away to show interior detail;

DETAILED DESCRIPTION OF THE INVENTION

Figure 3A:
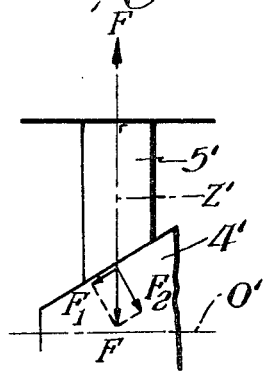
FIGS. 3(a) and (b) are diagrammatic views of a conventional measuring instrument.

Two-point and three-point inside measuring instruments include two and three feelers, respectively. Such instruments are utilized to measure inside dimensions, such as the interior diameter of tubular stock. With these instruments, the relationship of the feelers to a cone-shaped motivating head is as diagrammatically illustrated in FIGS. 3(a) and (b). As shown in these figures, a feeler 5' has a longtiudinal axis z' perpendicular to the central axis o' of a cone-shaped motivating head 4'. Each feeler is slidably fitted into an individual feeler hole 14' in the cylinder. A force F is applied to the feeler end face contacting the object to be measured as the motivating head 4' moves forward. No component forces are produced since the axis of the feeler is perpendicular to the face of the object being measured. However, since the inner end of the feeler 5' is inclined, component forces are produced at the location where the feeler engages the cone-shaped motivating head. As a result of these forces, the feeler 5' moves clockwise within the feeler hole 14' thereby causing a decrease in measurement accuracy.

As explained below, the present invention provides an inside measuring device in which the bar-shaped feeler members cooperate with the cone-shaped motivating head in a manner that avoids the above inaccuracy.

Figure 4A:
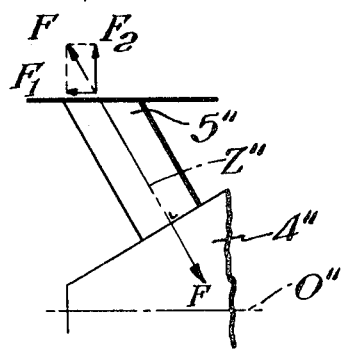
FIGS. 4(a) and (b) are diagrammatic views of another conventional measuring instrument.
Figure 4B:
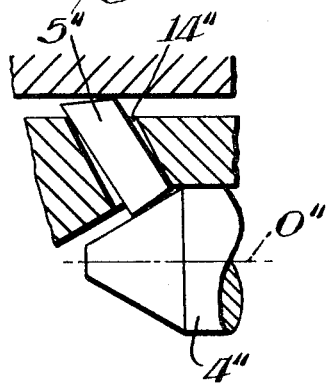
Figure 5B:
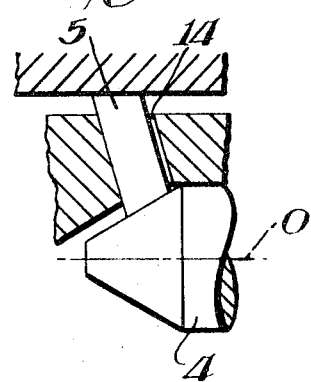

Referring to FIGS. 4(a) and (b), the longitudinal axis z'' of the feeler 5'' may be disposed perpendicular to the inclined face of the cone-shaped motivating head 4'' in order to eliminate the component of force from the end of the feeler that contacts the cone-shaped head. In this case, however, a component of force is produced at the end of the feeler 5'' which contacts the inside surface of the object being measured. These force components cause a counterclockwise rotation of the feeler 5'', as best shown in FIG. 4(b). Such rotation causes the measuring instrument to read inaccurately.

Figure 5A:
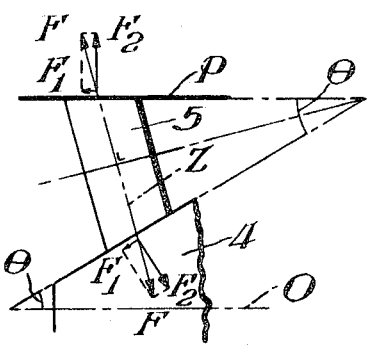
FIGS. 5(a) and (b) are diagrammatic views illustrating the operation of a measuring instrument according to the present invention.
Figure 3B:
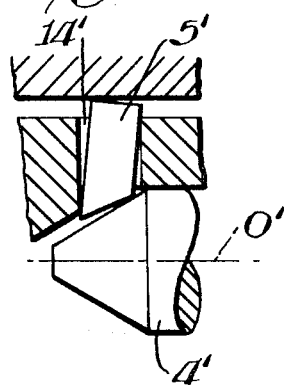

FIGS. 5(a) and (b) diagrammatically illustrate the present invention wherein the forces acting upon the opposite ends of each feeler bar are balanced. In accordance with the present invention the longitudinal axis z of each individual bar-shaped feeler member is perpendicular to a line that bisects an angle $\theta$ formed by the inclined face of the cone-shaped motivating head and the inside surface of the object being measured. As shown in FIG. 5(a), the angle $\theta$ is also formed by the inclined face of the cone-shaped motivating head and the longitudinal axis of the cone-shaped motivating head.

Each bar-shaped feeler member 5 of the present invention has ends of equal inclination. Thus, equal components of force act on these ends so that the feeler members squarely engage both the inside surface of the object to be measured and the inclined face of the cone-shaped motivating head. This relationship prevents the bar-shaped feeler members 5 from rocking or otherwise rotating in the manner described above in conjunction with conventional measuring instruments. As shown in FIGS. 1 and 2, a three-point micrometer comprises a cylinder 1 having an axial bore 13. An enlarged end portion of the cylinder is provided with feeler holes 14 which communicate with the axial bore 13 and extend radially outward. The feeler holes 14 each have a longitudinal axis which is perpendicular to the line that bisects the angle θ formed by the inclined face of the cone-shaped motivating head 4 and the longitudinal axis of the axial bore 13.

Figure 6:
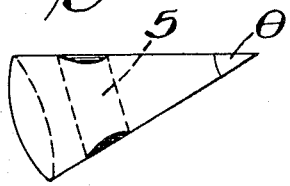
FIG. 6 is a perspective view illustrating the end portion construction of the bar-shaped feeler members according to the present invention.

Bar-shaped feeler members 5 are inserted into the feeler holes 14, as shown in FIG. 1. Each feeler has outwardly curved end portions formed in the manner diagrammatically illustrated in FIG. 6. As is readily understood from this diagram, both ends of each bar-shaped feeler member have an equal angle of inclination and an outwardly curved face which is equal to the inclined face of the cone-shaped motivating head.

A groove 7 is provided on the exterior surface of each feeler bar member 5, as shown in FIG. 1. A pin attached to the cylinder 1 fits into the groove 7 to keep each feeler 5 from rotating. Moreover, a recess 8 is located in each feeler 5 and a spring 10 is anchored between that recess 8 and a groove 9 in the cylinder 1. The spring 10 functions to urge each bar-shaped feeler member against the inclined face of the cone-shaped motivating head 4. The remaining unillustrated feelers of the measuring instruments are constructed in similar fashion. A cover 11 is fixed to the front end of the cylinder 1 by screws or similar fasteners to enclose the instrument.

An inner cylinder 12 having an internal thread is screwed into the rear end of the main cylinder 1. A spindle 15 positioned inside the inner cylinder 12 engages the cone-shaped head 4. An externally threaded portion 16 on the spindle 15 is screwed into an internally threaded portion 17 of the inner cylinder 12. A thimble 18 is securely fixed to the rear end of the spindle 15. The distance between the bar-shaped feeler members is read by a dial on the thimble and a dial on an outer cylinder 19 fixed to the exterior of the inner cylinder 12.

Figure 7:
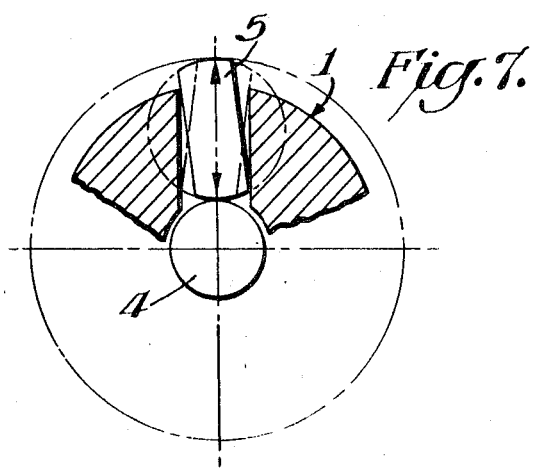
FIG. 7 is a diagrammatic view illustrating the end portion construction of the bar-shaped feeler members according to this invention and how that construction eliminates error caused by slight rotation of the feeler members.

As is readily understood, longitudinal movement of the cone-shaped motivating head produces forces which cause the bar-shaped feeler members to move toward and away from the motivating head. Additionally, the motivating head also applies a circumferential force to each of the feeler bars which tends to rotate the feeler bars in the manner shown in FIG. 7. However, since both ends of each feeler bar are composed of part of a cone body, the length of each feeler bar will not vary even though the feelers slightly rotate due to the motion of the cone-shaped head. This expedient enables the instrument to provide highly accurate readings. Finally, the instrument of this invention is extremely simple to construct and easy to manufacture. These instruments provide efficient and effective measuring with high reading accuracy.

What is claimed is:

1. An inside diameter measuring device comprising an elongated cylindrical housing having a longitudinal axis and having a measuring head at one end, a cone shaped motivating head in said measuring head having means connected thereto for moving the motivating head in a direction parallel to the longitudinal axis of the elongated cylindrical housing, and bar-shaped feeler members each of which at one end thereof is constructed and arranged to engage the inclined face of the cone-shaped motivating head for movement toward and away from the axis of the motivating head as the head moves in the longitudinal direction relative to the feeler members, the improvement according to which each bar-shaped feeler member has a longitudinal axis that when extended is perpendicular to a line that bisects the angle formed by the inclined face of the cone-shaped motivating head and the axis of the cone-shaped head, one end of each bar-shaped feeler member squarely engaging the inclined face of the cone-shaped motivating head and the other end of each feeler member squarely engaging the inside surface of the object being measured when the motivating head is positioned inside the object and the axis of the motivating head is parallel to the inside surface of the object.

2. The combination of claim 1 in which the ends of each bar-shaped feeler member are outwardly curved and the curves are equal.

References Cited

UNITED STATES PATENTS 2,881,529   4/1959   Roch _____ 33—178

OTHER REFERENCES 245,407   7/1947   Switzerland _____ 33—178

LEONARD FORMAN, Primary Examiner

A. J. MIRABITO, Assistant Examiner